(12) United States Patent
Xu et al.

(10) Patent No.: US 12,519,539 B2
(45) Date of Patent: Jan. 6, 2026

(54) WIRELESS COMMUNICATION METHOD AND APPARATUS, AND COMMUNICATION DEVICE

(71) Applicant: GUANGDONG OPPO MOBILE TELECOMMUNICATIONS CORP., LTD., Guangdong (CN)

(72) Inventors: Weijie Xu, Guangdong (CN); Zhisong Zuo, Guangdong (CN); Chuanfeng He, Guangdong (CN); Shuai Shao, Guangdong (CN); Shengjiang Cui, Guangdong (CN); Rongyi Hu, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 23 days.

(21) Appl. No.: 18/426,304

(22) Filed: Jan. 29, 2024

(65) Prior Publication Data
US 2024/0171269 A1    May 23, 2024

Related U.S. Application Data

(63) Continuation of application No. PCT/CN2021/110488, filed on Aug. 4, 2021.

(51) Int. Cl.
*H04B 7/22* (2006.01)
*H04B 5/24* (2024.01)
(Continued)

(52) U.S. Cl.
CPC ............... *H04B 7/22* (2013.01); *H04B 5/24* (2024.01); *H04B 5/45* (2024.01); *H04B 17/328* (2023.05);
(Continued)

(58) Field of Classification Search
CPC ...... H04B 7/22; H04B 17/328; H04B 17/336; H04B 5/45; H04W 48/16; H04W 72/51; H04W 8/24; H04W 52/146; H04W 52/367
(Continued)

(56) References Cited

U.S. PATENT DOCUMENTS

2012/0057802 A1*  3/2012  Yuki ................. H04N 19/59
                                                 382/243
2014/0185530 A1*  7/2014  Kuchibhotla ..... H04W 72/0446
                                                 370/329
(Continued)

FOREIGN PATENT DOCUMENTS

CN    110324068 A    10/2019
CN    112399542 A    2/2021
(Continued)

OTHER PUBLICATIONS

"Information technology—Radio frequency identification for item management—Part 6: Parameters for air interface communications at 860 MHz to 960 MHz", ISO/IEC 18000-6:2010, IEC, 3, Rue De Varembé, PO Box 131, CH-1211 Geneva 20, Switzerland, Nov. 24, 2010 (Nov. 24, 2010), pp. 1-128 of 446 pages (part 1 of 4 parts).
(Continued)

*Primary Examiner* — Emmanuel Bayard
(74) *Attorney, Agent, or Firm* — Ladas & Parry, LLP

(57) ABSTRACT

A wireless communication method includes: a first device reports first information to a second device, the first information being applied to backscatter communication.

20 Claims, 6 Drawing Sheets

The second device receives the first information reported by the first device — S1301

(51) Int. Cl.
  *H04B 5/45*     (2024.01)
  *H04B 17/318*   (2015.01)
  *H04B 17/336*   (2015.01)
  *H04W 48/16*    (2009.01)
  *H04W 72/51*    (2023.01)

(52) U.S. Cl.
  CPC .......... *H04B 17/336* (2015.01); *H04W 48/16* (2013.01); *H04W 72/51* (2023.01)

(58) Field of Classification Search
  USPC .................................................. 375/219–222
  See application file for complete search history.

(56) References Cited

U.S. PATENT DOCUMENTS

| | | | | |
|---|---|---|---|---|
| 2015/0089248 | A1* | 3/2015 | Obie | G06F 1/263 |
| | | | | 713/300 |
| 2019/0363843 | A1* | 11/2019 | Gordaychik | H04W 72/044 |
| 2020/0034583 | A1* | 1/2020 | Nikitin | G06K 7/10128 |
| 2020/0236571 | A1* | 7/2020 | Lopez | H04L 27/2042 |
| 2021/0004544 | A1 | 1/2021 | Zhang | |
| 2021/0119726 | A1* | 4/2021 | Kim | G06N 3/08 |
| 2021/0175999 | A1* | 6/2021 | Kittichokechai | H04L 1/0016 |
| 2021/0212071 | A1* | 7/2021 | Liu | H04W 72/53 |
| 2022/0022158 | A1* | 1/2022 | Zarifi | H04L 5/0048 |
| 2022/0224583 | A1* | 7/2022 | Rosenthal | H04L 27/02 |

FOREIGN PATENT DOCUMENTS

| | | |
|---|---|---|
| WO | 2018034439 A1 | 2/2018 |
| WO | 2021031662 A1 | 2/2021 |

OTHER PUBLICATIONS

"Information technology—Radio frequency identification for item management—Part 6: Parameters for air interface communications at 860 MHz to 960 MHz", ISO/IEC 18000-6:2010, IEC, 3, Rue De Varembé, PO Box 131, CH-1211 Geneva 20, Switzerland, Nov. 24, 2010 (Nov. 24, 2010), pp. 129-228 of 446 pages (part 2 of 4 parts).
"Information technology—Radio frequency identification for item management—Part 6: Parameters for air interface communications at 860 MHz to 960 MHz", ISO/IEC 18000-6:2010, IEC, 3, Rue De Varembé, PO Box 131, CH-1211 Geneva 20, Switzerland, Nov. 24, 2010 (Nov. 24, 2010), pp. 229-329 of 446 pages (part 3 of 4 parts).4.
"Information technology—Radio frequency identification for item management—Part 6: Parameters for air interface communications at 860 MHz to 960 MHz", ISO/IEC 18000-6:2010, IEC, 3, Rue De Varembé, PO Box 131, CH-1211 Geneva 20, Switzerland, Nov. 24, 2010 (Nov. 24, 2010), pp. 230-446 of 446 pages (part 4 of 4 parts).
Supplementary European Search Report in the corresponding European patent application No. 21952223.2, mailed on Sep. 25, 2024, 8 pages.
Huawei et al., "Passive IoT for 5G Advanced", 3GPP TSG RAN Rel-18 workshop, RWS-210453, Jul. 2, 2021 (Jul. 2, 2021), entire document.
International Search Report in the international application No. PCT/CN2021/110488, mailed on May 5, 2022 with English translation.
English translation of the Written Opinion of the International Search Authority in the international application No. PCT/CN2021/110488, mailed on May 5, 2022 with English translation.
Oppo, "New SID: Study on Wireless Power Sourcing enabled Communication Services in 5GS", 3GPP TSG-SA WG1 Meeting #94e, S1-211120, Electronic Meeting, May 10-20, 2021, Section 3, 3 pages.

* cited by examiner

WIRELESS COMMUNICATION METHOD AND APPARATUS, AND COMMUNICATION DEVICE

CROSS-REFERENCE TO RELATED APPLICATION

This application is a continuation of International Application No. PCT/CN2021/110488 filed on Aug. 4, 2021, the disclosure of which is hereby incorporated by reference in its entirety.

BACKGROUND

The zero-power-consumption communication has been widely applied to various industries, including vertical industry-oriented logistics, intelligent warehousing, smart agriculture, energy and power, industrial Internet, and the like, and can also be applied to personal applications such as smart wearable devices and smart homes.

Key technologies of the zero-power-consumption communication mainly include Radio Frequency (RF) energy harvesting and backscatter communication. A zero-power-consumption terminal does not need to use a traditional battery due to the use of the RF energy harvesting. Based on the backscatter communication, the zero-power-consumption terminal does not need a complex RF link or a high-frequency crystal oscillator; moreover, the signal transmission on the terminal does not consume the energy of the terminal per se. Therefore, the zero-power-consumption communication has significant advantages of low cost, zero power consumption, small size, and the like.

SUMMARY

Embodiments of the disclosure relate to the technical field of mobile communication, and in particular, to a wireless communication method and apparatus, and a communication device.

Embodiments of the disclosure provide a wireless communication method and apparatus, and a communication device.

A wireless communication method provided by the embodiments of the disclosure may include the following operation. A first device may report first information to a second device. The first information may be applied to backscatter communication.

A wireless communication method provided by the embodiments of the disclosure may include the following operation. A second device may report first information reported by a first device. The first information may be applied to backscatter communication.

A wireless communication apparatus provided by the embodiments of the disclosure, applied to a first device, may include a processor, a memory and a transceiver. The memory is configured to store computer-executable instructions; and the processor is configured to invoke and run the computer-executable instructions stored in the memory to perform an operation of: reporting, through the transceiver, first information to a second device, the first information being applied to backscatter communication.

A wireless communication apparatus provided by the embodiments of the disclosure, applied to a second device, may include a processor, a memory and a transceiver. The memory is configured to store computer-executable instructions; and the processor is configured to invoke and run the computer-executable instructions stored in the memory to perform an operation of: receiving, through the transceiver, first information reported by a first device, the first information being applied to backscatter communication.

BRIEF DESCRIPTION OF THE DRAWINGS

Drawings described herein are used for providing a further understanding of the disclosure and constitute a part of the disclosure. Illustrative embodiments and their explanations of the disclosure are used for describing the disclosure and do not constitute an improper limitation of the disclosure. In the drawings.

DETAILED DESCRIPTION

The technical solutions in the embodiments of the disclosure are described below with reference to the drawings in the embodiments of the disclosure. It is apparent that the described embodiments are part rather than all embodiments of the disclosure. All other embodiments obtained by those of ordinary skill in the art based on the embodiments of the disclosure without creative efforts fall within the scope of protection of the disclosure.

Figure 1:
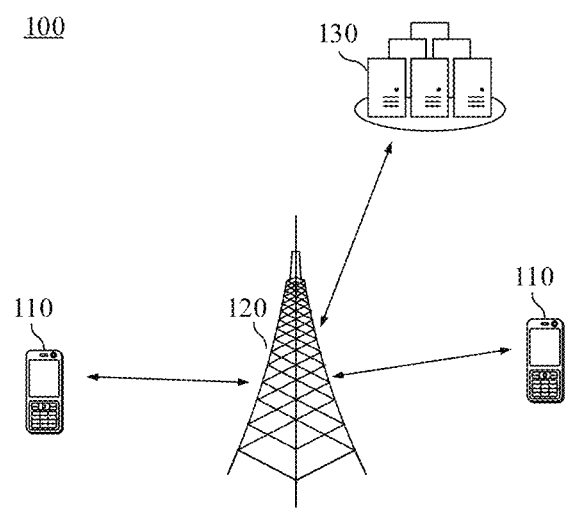
FIG. 1 is a schematic diagram of an application scenario according to an embodiment of the disclosure.

FIG. 1 is a schematic diagram of an application scenario according to an embodiment of the disclosure.

As shown in FIG. 1, a communication system 100 may include a terminal device 110 and a network device 120. The network device 120 may communicate with the terminal device 110 through an air interface. Transmission of a plurality of services is supported between the terminal device 110 and the network device 120.

It is to be understood that the embodiment of the disclosure is only described by taking the communication system 100 as an example, but the embodiment of the disclosure is not limited thereto. That is, technical solutions of the embodiment of the disclosure are applicable to various communication systems, for example, a Long Term Evolution (LTE) system, a Time Division Duplex (TDD) system, a Universal Mobile Telecommunication System (UMTS), an Internet of Things (IoT) system, a Narrow Band Internet of Things (NB-IoT) system, an enhanced Machine-Type Communications (eMTC) system, a 5th generation (5G) communication system (also called a New Radio (NR) communication system), or a future communication system.

In the communication system 100 as shown in FIG. 1, the network device 120 may be an access network device that communicates with the terminal device 110. The access network device may provide communication coverage for a specific geographical area, and may communicate with the terminal device 110 (for example, a User Equipment (UE)) located within the coverage.

The network device 120 may be an Evolutional Node B (eNB or eNodeB) in the LTE system or a Next Generation Radio Access Network (NG RAN) device, or a base station (gNB) in an NR system, or a wireless controller in a Cloud Radio Access Network (CRAN). Or, the network device 120 may be a relay station, an access point, an on-board device, a wearable device, a hub, a switch, a network bridge, a router, or a network device in a future evolved Public Land Mobile Network (PLMN), or the like.

The terminal device 110 may be any terminal device, which includes but is not limited to a terminal device that is connected to the network device 120 or other terminal devices in a wired or wireless manner.

For example, the terminal device 110 may refer to an access terminal, an UE, a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, an IoT device, a satellite hand-held terminal, a Wireless Local Loop (WLL) station, a Personal Digital Assistant (PDA), a hand-held device having a wireless communication function, a computing device or another processing device connected to a wireless modem, an on-board device, a wearable device, a terminal device in a 5G network, a terminal device in future evolved network.

The terminal device 110 may be applied to Device to Device (D2D) communication.

The wireless communication system 100 may further include a core network device 130 that communicates with a base station. The core network device 130 may be a 5G Core (5GC) device, for example, an Access and Mobility Management Function (AMF), for another example, an Authentication Server Function (AUSF), for another example, a User Plane Function (UPF), and for another example, a Session Management Function (SMF). Optionally, the core network device 130 may also be an Evolved Packet Core (EPC) device of the LTE network, for example, a Session Management Function+Core Packet Gateway (SMF+PGW-C) device. It is to be to understood that the SMF+PGW-C may realize the functions that can be realized by the SMF and the PGW-C. In a network evolving process, the above core network device may also have other names, or may form new network entities by dividing the functions of the core network. No limits are made thereto in the embodiments of the disclosure.

Communication may also be realized among various functional units in the communication system 100 by establishing a connection through a next generation (NG) interface.

For example, a terminal device establishes an air interface connection with an access device through an Uu interface for transmitting user plane data and control plane signaling; the terminal device may establish a control plane signaling connection with the AMF through an NG interface 1 (called N1 for short); the access network device, for example, a next generation radio access base station (gNB), may establish a user plane data connection with the UPF through an NG interface 3 (called N3 for short); the access network device may establish a control plane signaling connection with the AMF through an NG interface 2 (called N2 for short); the UPF may establish a control plane signaling connection with the SMF through an NG interface 4 (called N4 for short); the UPF may interact user plane data with a data network through an NG interface 6 (called N6 for short); the AMF may establish a control plane signaling connection with the SMF through an NG interface 11 (called N11 for short); and the SMF may establish a control plane signaling connection with a Point Coordination Function (PCF) through an NG interface 7 (called N7 for short).

FIG. 1 exemplarily illustrates one base station, one core network device, and two terminal devices. Optionally, the wireless communication system 100 may include a plurality of base stations and the coverage of each base station may include other quantities of terminal devices. No limits are made thereto in the embodiments of the disclosure.

It is to be noted that FIG. 1 only illustrates a system to which the disclosure is applied in a form of an example. Of course, the method shown in the embodiment of the disclosure may also be applied to other systems. In addition, the terms "system" and "network" herein are often used interchangeably herein. The term "and/or" herein is only an association relationship for describing associated objects and indicates that three relationships may exist. For example, A and/or B may indicate the following three cases: only A exists, both A and B exist, and only B exists. In addition, the character "I" herein generally indicates that the contextual objects are in an "or" relationship. It is also to be understood that the "indication" mentioned in the embodiments of the disclosure may be direct indication, or indirect indication, or indicate that there is an association relationship. For example, A indicating B may indicate that A directly indicates B, for example, B may be acquired through A, or indicate that A indirectly indicates B, for example, A indicates C, and B may be acquired through C, or indicate that there is an association relationship between A and B. It is also to be understood that the term "corresponding" can indicate that there is a direct or indirect correspondence between the two, or that there is an association between them, or that there is a relationship between indication and being indicated, configuration and being configured, or the like. It is also to be understood that "predefined" or "a predefined rule" mentioned in the embodiments of the disclosure may be implemented by pre-storing corresponding code, tables, or other manners that can be used for indicating related information in a device (for example, including a terminal device and a network device). No limits are made to a specific implementation thereof in the disclosure. For example, "predefined" may refer to "predefined" in a protocol. It is also to be understood that, in the embodiments of the disclosure, the "protocol" may refer to a standard protocol in a communication field, for example, including an LTE protocol, an NR protocol, and a related protocol applied to a future communication system. No limits are made thereto in the disclosure.

In order to facilitate the understanding of the technical solutions of the embodiments of the disclosure, related technologies of the embodiments of the disclosure are described below. The following related technologies may be randomly combined with the technical solutions of the embodiments of the disclosure as optional solutions, which all belong to the scope of protection of the embodiments of the disclosure.

Zero-Power-Consumption Communication

Figure 2:
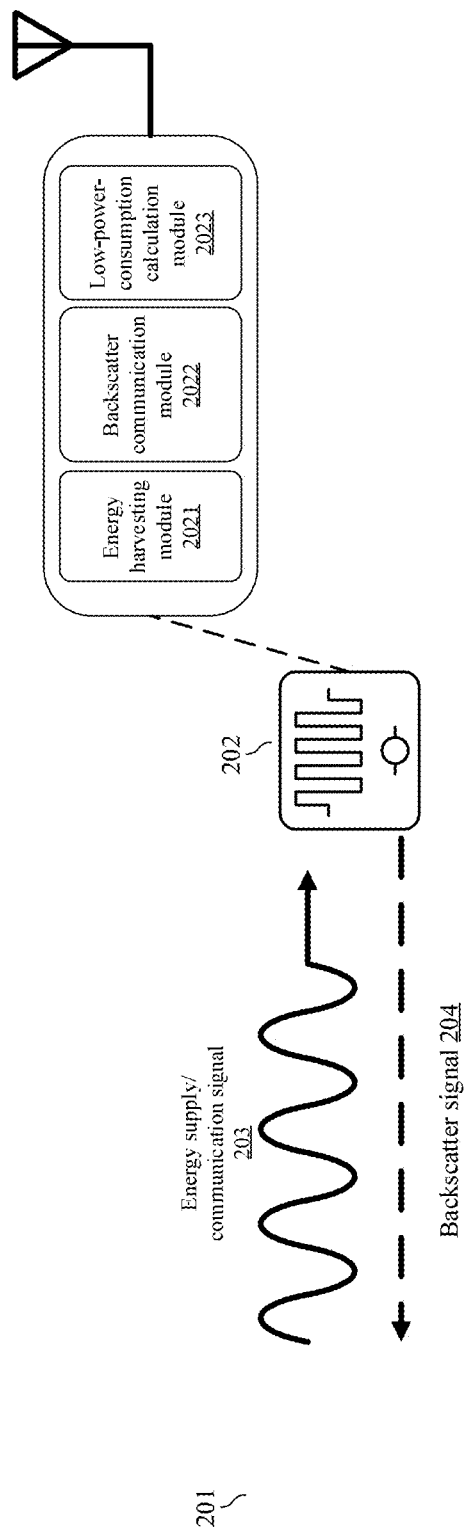
FIG. 2 is a schematic diagram of an optional scenario for zero-power-consumption communication according to an embodiment of the disclosure.

The zero-power-consumption communication uses energy harvesting and backscatter communication technologies. As shown in FIG. 2, a zero-power-consumption communication network 200 is formed by a network device 201 and a zero-power-consumption terminal 202. The network device 201 is configured to transmit an energy supply signal or a communication signal 203 to the zero-power-consumption terminal 202, and receive a backscatter signal 204 of the zero-power-consumption terminal 202.

Optionally, the zero-power-consumption terminal may be understood as an electronic label and a backscatter label. The network may be understood as a device that can communicate with the zero-power-consumption terminal, for example, a reader of a Radio Frequency Identification (RFID) system, a UE, and a base station. The UE may include an intelligent terminal such as a cell phone and a personal computer.

As shown in FIG. 2, a basic zero-power-consumption terminal 202 includes an energy harvesting module 2021, a backscatter communication module 2022, and a low-power-consumption calculation module 2023.

In addition, the zero-power-consumption terminal 202 also has a memory or a sensor. The memory is configured to store some basic information (for example, an item identifier). The memory is configured to acquire sensing data such as an environment temperature and an environment humidity.

Key technologies of the zero-power-consumption communication mainly include RF energy harvesting and backscatter communication.

The RF energy harvesting is implemented by the energy harvesting module 2021.

The RF energy harvesting module harvests space electromagnetic wave energy based on the principle of electromagnetic induction, so as to obtain energy required for driving the zero-power-consumption terminal, for example, obtaining energy for driving a low-power-consumption demodulation and modulation module (that is, a low-power-consumption calculation module) and a sensor, and for driving reading of an internal memory. Therefore, the zero-power-consumption terminal does not need a conventional battery.

Figure 3:
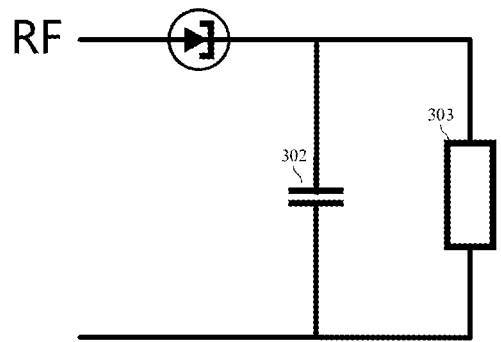
FIG. 3 is an optional schematic structural diagram of a Radio Frequency (RF) energy module according to an embodiment of the disclosure.

A structure of the RF energy harvesting module is as shown in FIG. 3, and the module includes a diode 301, a capacitor 302, and a resistor 303, so as to harvest the energy of RF in space.

Optionally, an end, connected to the diode 301, of the capacitor 302 is a positive electrode.

Figure 4:
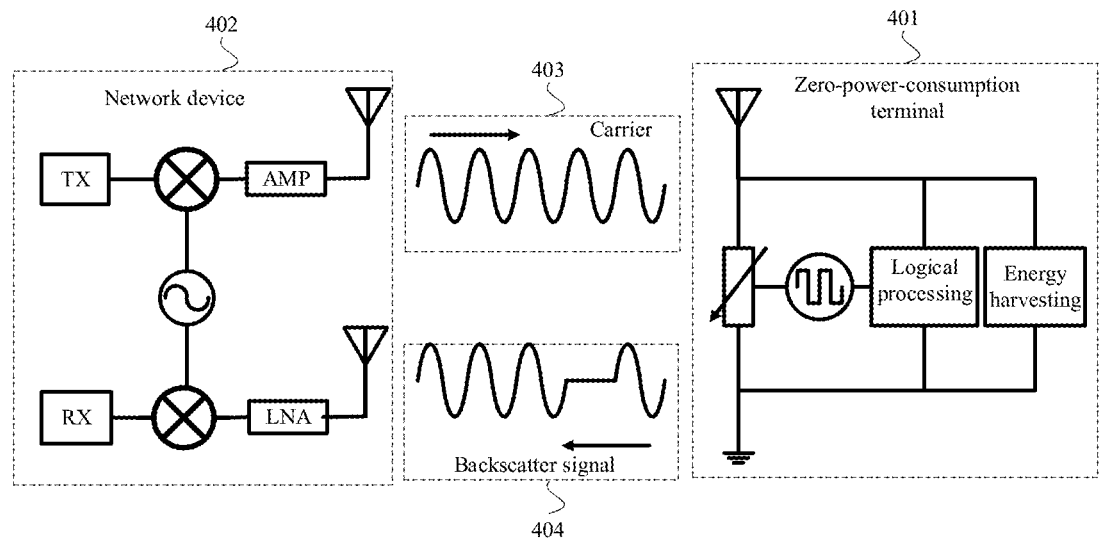
FIG. 4 is a schematic diagram of an optional scenario for backscatter communication according to an embodiment of the disclosure.

A principle of the backscatter communication is shown in FIG. 4. A zero-power-consumption terminal 401 receives a carrier 403 transmitted by the network device 402, modulates the received carrier 403 to load information to be transmitted, and radiates the modulated signal from an antenna as a backscatter signal 404. This information transmission process is called the backscatter communication. A Transmitter (TX) of the network device 402 is connected to an Amplifier (AMP). A Receiver (RX) of the network device 402 is connected to a Low Noise Amplifier (LNA).

The backscatter communication and a load modulation function are inseparable. Load modulation adjusts and controls circuit parameters of an oscillating circuit of the zero-power-consumption terminal according to a rhythm of a data flow, so that parameters such as an impedance change accordingly, thereby completing a modulation process.

Figure 5:
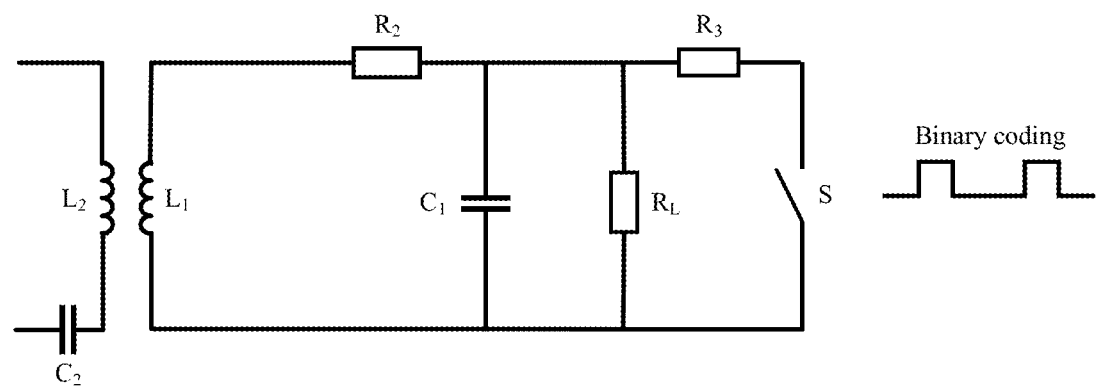
FIG. 5 is an optional schematic structural diagram of a zero-power-consumption terminal according to an embodiment of the disclosure.

The load modulation includes two manners of resistive load modulation and capacitive load modulation. In the resistive load modulation, as shown in FIG. 5, a load RL is connected in parallel with a resistor R3. The resistor R3 is controlled to be on or off based on a binary data flow. The on or off of the R3 can be realized through the on or off of S. As shown in FIG. 5, the zero-power-consumption terminal further includes $R_2$, $L_1$, $L_2$, and $C_2$. The on or off of the resistor $R_3$ will cause a change of a voltage of an oscillating circuit, so as to realize Amplitude Shift Keying (ASK), that is, modulation and transmission of a signal are realized through the amplitude of a backscatter signal of the zero-power-consumption terminal. Similarly, in the capacitive load modulation, the on or off of a capacitor may realize a change of an oscillating frequency of the oscillating circuit, so as to realize Frequency Shift Keying (FSK), that is, the modulation and the transmission of the signal are realized through a working frequency of the backscatter signal of the zero-power-consumption terminal.

It can be seen that the zero-power-consumption terminal performs information modulation on an incoming-wave signal by means of load modulation, so as to realize a backscatter communication process. Therefore, the zero-power-consumption terminal has significant advantages.

(1) A terminal does not actively transmit a signal, so a complex RF link is not required, for example, a Power Amplifier (PA) and an RF filter.
(2) The terminal does not need to actively generate a high-frequency signal, so a high-frequency crystal oscillator is not required.
(3) By means of the backscatter communication, terminal signal transmission does not need to consume the energy of the terminal per se.

Application Scenario of Zero-Power-Consumption Communication

Due to the significant advantages of low cost, zero power consumption, small size, and the like, the zero-power-consumption communication can be widely applied to various industries, for example vertical industry-oriented logistics, intelligent warehousing, smart agriculture, energy and power, industrial Internet, and the like, and can also be applied to personal applications such as smart wearable devices and smart homes.

Coding Manner of Zero-Power-Consumption Communication

Data transmitted by the zero-power-consumption communication terminal may use codes in different coding forms to represent binary "1" and "0". Commonly used coding manners include one of the following coding manners: Non Return-to-Zero (NRZ) coding, Manchester coding, unipolar Return-to-Zero (RZ) coding, Differential Binary Phase (DBP) coding, Miller coding, and differential coding. Using different coding manners may be understood as representing 0 and 1 by using different pulse signals.

NRZ Coding

Figure 6:
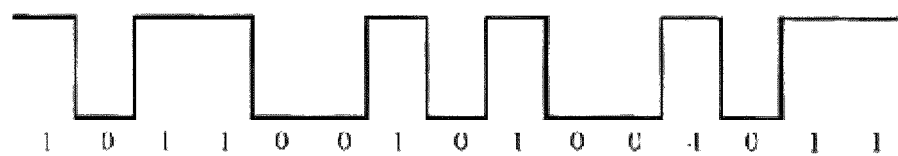
FIG. 6 is a schematic diagram of an optional pulse of a coding manner according to an embodiment of the disclosure.

As shown in FIG. 6, the NRZ coding represents binary "1" by using a high level, and represents binary "0" by using a low level.

Manchester Coding

Figure 7:
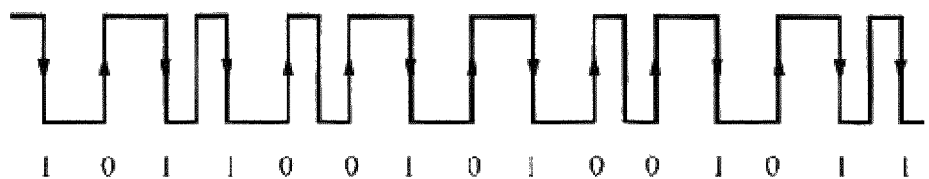
FIG. 7 is a schematic diagram of an optional pulse of a coding manner according to an embodiment of the disclosure.

The Manchester coding is also called the split phase coding. In the Manchester coding, as shown in FIG. 7, the value of a certain bit is represented by the change (rising/falling) in level in a half bit cycle within this bit length. A negative jump, that is, falling, in the half bit cycle indicates the binary "1", and a positive jump, that is, rising, in the half bit cycle indicates the binary "0".

When load modulation of a carrier or backscatter modulation is used, the Manchester coding is generally used for the data transmission from an electronic label to a reader, because this is beneficial to finding an error of the data transmission. This is because an "unchanged" state is not allowed within the bit length. When the data bits simultaneously transmitted by a plurality of electronic labels have different values, a rising edge and a falling edge received cancel out each other, resulting in an uninterrupted carrier signal within the overall bit length. Since the state is not allowed, the reader may determine a specific location whether a collision occurs by using the error.

Unipolar RZ Coding

Figure 8:
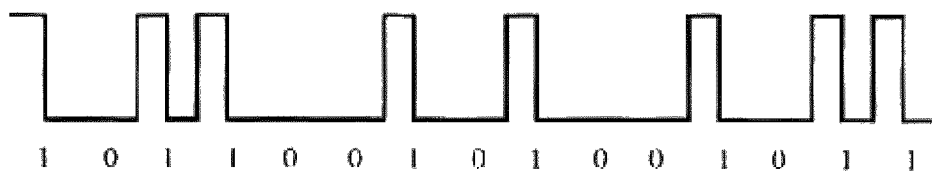
FIG. 8 is a schematic diagram of an optional pulse of a coding manner according to an embodiment of the disclosure.

The unipolar RZ coding, as shown in FIG. 8, the high level in a first half bit cycle represents binary "1", and a low level signal that persists throughout the overall bit cycle represents binary "0". The unipolar RZ coding may be used for extracting a bit synchronization signal.

DBP Coding

Figure 9:
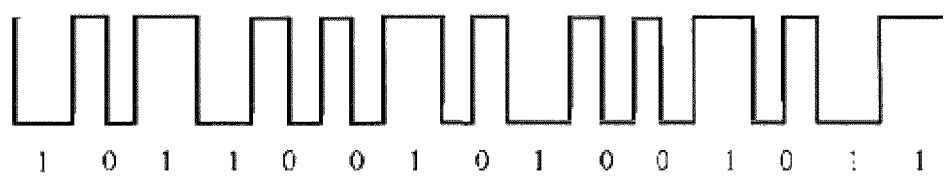
FIG. 9 is a schematic diagram of an optional pulse of a coding manner according to an embodiment of the disclosure.

As shown in FIG. 9, the DBP code identifies logical "1" and "0" based on a level change in a half bit cycle. The existence of any edge in the half bit cycle represents binary "0", and the absence of an edge represents binary "1", that is, if a level jumps at a beginning of one bit cycle, it indicates "1", and if the level jumps not only at the beginning of one bit cycle, but also in the middle of the bit cycle, it indicates "0". In addition, at the beginning of each bit cycle, the level will be reversed. Therefore, for a receiver, a bit beat is easy to be reconstructed.

Miller Coding

Figure 10:
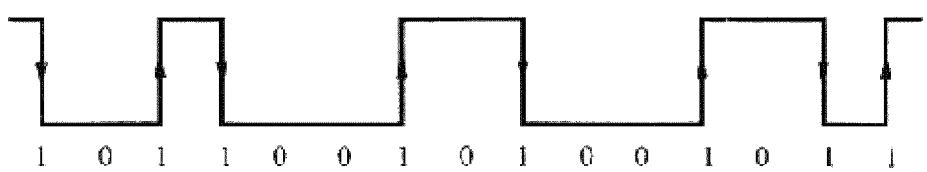
FIG. 10 is a schematic diagram of an optional pulse of a coding manner according to an embodiment of the disclosure.

The Miller coding, as shown in FIG. 10, any edge in a half bit cycle represents binary "1", and an unchanged level in the next bit cycle represents binary "0". Level alternating occurs at the beginning of the bit cycle. Therefore, for a receiver, a bit beat is easy to be reconstructed.

Differential Coding

Figure 11:
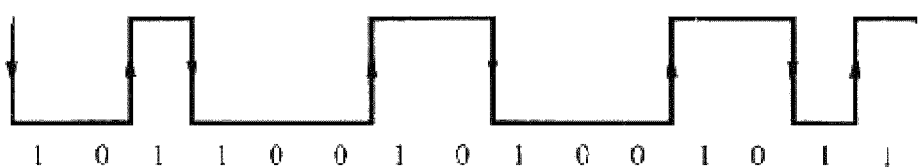
FIG. 11 is a schematic diagram of an optional pulse of a coding manner according to an embodiment of the disclosure.

In the differential coding, as shown in FIG. 11, each binary "1" to be transmitted will cause a change of a signal level. For binary "0", the signal level is kept unchanged.

Classification of Zero-Power-Consumption Terminals

The zero-power-consumption terminals may be classified into the following types based on an energy source of the zero-power-consumption terminal and a using manner 1) Passive Zero-Power-Consumption Terminal A battery does not need to be arranged in the zero-power-consumption terminal; and when the zero-power-consumption terminal approaches a network device, the zero-power-consumption terminal is located in a near field range formed by radiation of an antenna of the network device. In addition, an antenna of the zero-power-consumption terminal generates an induced current through electromagnetic induction, and then the induced current drives a low-power-consumption chip circuit of the zero-power-consumption terminal, so as to perform operations, for example, demodulating a forward link signal and modulating a backward link signal. For a backscatter link, the zero-power-consumption terminal transmits the signal by means of an implementation of backscatter.

No matter the passive zero-power-consumption terminal is a forward link or a backward link, the passive zero-power-consumption terminal does not need to be driven by a built-in battery, so the passive zero-power-consumption terminal is a true zero-power-consumption terminal.

The passive zero-power-consumption terminal does not need the battery, and an RF circuit and a baseband circuit are very simple, for example, devices such as a Low Noise Amplifier (LNA), a PA, a crystal oscillator, and an Analog-to-Digital Converter (ADC) are not required. Therefore, the passive zero-power-consumption terminal has a many advantages of small size, light weight, cheap price, long service life, and the like.

2) Semi-Passive Zero-Power-Consumption Terminal

The semi-passive zero-power-consumption terminal is also not provided with a conventional battery, but may harvest radio wave energy by using an RF energy harvesting module, and simultaneously, store the harvested energy in an energy storage unit (for example, a capacitor). After obtaining the energy, the energy storage unit may drive the low-power-consumption chip circuit of the zero-power-consumption terminal. The operations of demodulating a forward link signal and modulating a backward link signal are realized. For a backscatter link, the semi-passive zero-power-consumption terminal transmits the signal by means of an implementation of backscatter.

No matter it is for a forward link or a backward link, the semi-passive zero-power-consumption terminal does not need to be driven by a built-in battery, and although the energy stored by the capacitor is used during operation, the energy is derived from radio energy harvested by the energy harvesting module. Therefore, the semi-passive zero-power-consumption terminal is also a true zero-power-consumption terminal.

The semi-passive zero-power-consumption terminal inherits many advantages of the passive zero-power-consumption terminal, and has many advantages of small size, light weight, cheap price, long service life, and the like.

3) Active Zero-Power-Consumption Terminal

In some scenarios, the zero-power-consumption terminal used may also be the active zero-power-consumption terminal, and the terminal may be internally provided with a battery. The battery is configured to drive the low-power-consumption chip circuit of the zero-power-consumption terminal, so as to realize operations of demodulating the forward link signal and modulating the backward link signal. However, for the backscatter link, the zero-power-consumption terminal transmits the signal by means of an implementation of backscatter. Therefore, zero power consumption of this type of terminal is mainly reflected in the fact that signal transmission of the backward link does not require the power of the terminal, but uses a backscatter manner.

The active zero-power-consumption terminal is internally provided with a battery to supply power to an RFID chip, so as to increase a reading-writing distance of the label and improve the reliability of communication. The active zero-power-consumption terminal is applied to scenarios that have high requirements in aspects such as a communication distance and reading delay.

As applications in 5G industry increase, there are more and more types and application scenarios of linkers, and there are also higher requirements for the price and power consumption of a communication terminal. The application of a battery-free and low-cost passive Internet of Things device becomes the key technology of the cellular Internet of Things, which enriches the types and quantities of 5G network linked terminals, thereby truly realizing Internet of Everything. The passive Internet of Things device may be based on zero-power-consumption communication technology, for example, an RFID technology, and extends on this basis, so as to be adapted to the cellular Internet of Things.

There are various scenarios for the zero-power-consumption communication. Different communication scenarios have different requirements on terminals. Therefore, various features supported by the terminals or the capabilities of the terminals in different application scenarios may be different. For a zero-power-consumption communication scenario, which features or terminal capabilities are needed to be known by the network, and how the network obtains them are problems that need to be solved.

In order to facilitate the understanding of the technical solutions of the embodiments of the disclosure, the technical solutions of the disclosure are described below through specific embodiments. The above related technologies may be randomly combined with the technical solutions of the embodiments of the disclosure as optional solutions, which all belong to the scope of protection of the embodiments of the disclosure. The embodiment of the disclosure includes at least of the following content.

Figure 12:
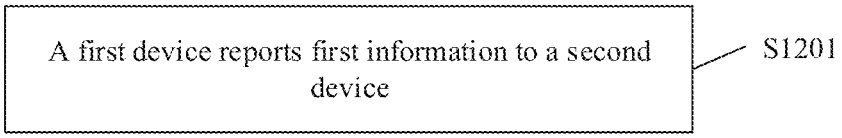
FIG. 12 is an optional flowchart of a wireless communication method according to an embodiment of the disclosure.

A wireless communication method provided by the embodiments of the disclosure as shown in FIG. 12, applied to a first device, includes the following step.

At S1201, a first device reports first information to a second device.

Optionally, the first information is applied to backscatter communication, or the first information is indicates a communication capability of the zero-power-consumption communication of the first device, or the first information indicates related capabilities of the first device in the zero-power-consumption communication.

Figure 13:
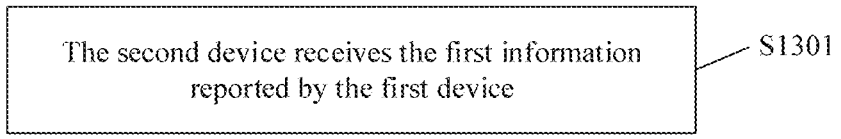
FIG. 13 is an optional flowchart of a wireless communication method according to an embodiment of the disclosure.

The embodiment of the disclosure provides a wireless communication method, as shown in FIG. 13, applied to a second device, includes the following step.

At S1301, a second device reports of first information reported by a first device.

Optionally, the first information is applied to backscatter communication, or the first information is indicates a communication capability of the zero-power-consumption communication of the first device, or the first information indicates related capabilities of the first device in the zero-power-consumption communication.

Figure 14:
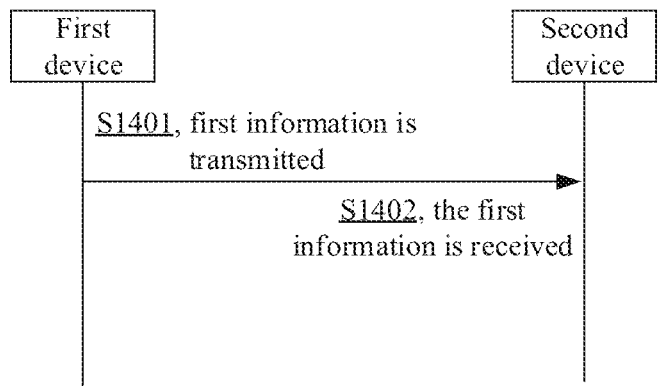
FIG. 14 is an optional flowchart of a wireless communication method according to an embodiment of the disclosure.

The embodiment of the disclosure provides a wireless communication method, as shown in FIG. 14, includes the following steps.

At S1401, a first device transmits first information to a second device.

At S1402, the second device receives the first information transmitted by the first device.

Optionally, the first information is applied to backscatter communication, or the first information is indicates a communication capability of the zero-power-consumption communication of the first device, or the first information indicates related capabilities of the first device in the zero-power-consumption communication.

In the embodiment of the disclosure, a communication manner between the first device and the second device may include one of the following: near field communication, long distance communication, and the like. The first device may communicate with the second device through energy harvesting and/or backscatter communication.

According to the wireless communication method provided by the embodiment of the disclosure, the first device transmits information indicating a capability related to the zero-power-consumption communication to the second device, so that the second device can know the capability related to the zero-power-consumption communication of the first device. Further, the second device can configure a communication parameter or select a proper communication manner for the first device according to the first information.

In some embodiments, the step that the first device reports the first information to the second device includes the following operation.

The first device reports the first information to the second device through a first connection with the second device.

In this case, the step that the second device receives the first information reported by the first device includes the following operation.

The second device receives, through a first connection with the first device, the first information reported by the first device.

In some embodiments, the first connection is established based on second information.

In some embodiments, the second information is pre-agreed by the first device and the second device.

A connection is established between the first device and the second device based on the pre-agreed second information, so that the first connection can be established in a case that the first device communicates or does not communicate with a device.

In some embodiments, the second information includes at least one of the following:

a coding type or a modulation method.

Optionally, the coding type includes at least one of the following: NRZ coding, Manchester coding, unipolar RZ coding, DBP coding, Miller coding, or differential coding.

Optionally, the modulation method includes at least one of the following: ASK, FSK, or PSK.

In an example, the second information includes a coding type of the Manchester coding and a modulation method of the ASK. The first device codes the information to be transmitted based on the Manchester coding, modulates the coded information based on the ASK, and transmits the modulated signal to the second device. The second device demodulates a received signal through the ASK, and decodes the demodulated signal based on a decoding manner corresponding to the Manchester coding to obtain the data transmitted by the first device. Optionally, the first device receives a wireless signal transmitted by the second device, modulates the received wireless signal to load the second information, which needs to be transmitted, to the received wireless signal, and transmits the modulated wireless signal to the second device.

In some embodiments, the first information is used for indicating a first capability of the first device, and the first capability includes at least one of the following:
capability A: an electricity storage capability;
capability B: a channel support capability;
capability C: an antenna gain;
capability D: a modulation method support capability;
capability E: a channel measurement capability;
capability F: a power control capability;
capability G: a security capability;
capability H: a supported coding type; or
capability I: an information storage capability.

In an example, the first capability indicated by the first information includes: capability A and capability B.

In an example, the first capability indicated by the first information includes capability A.

In an example, the first capability indicated by the first information includes: capability A, capability C, and capability E.

In an example, the first capability indicated by the first information includes: capability A, capability B, and capability I.

In the embodiment of the disclosure, the first capability indicated by the first information transmitted by the first device to the second device may include one or more of capability A to capability I.

For capability A, the electricity storage capability represents whether the first device supports electricity storage or not, and an electricity storage capacity in a case that the first device supports electricity storage.

The electricity storage capability affects a time that the second device transmits an energy supply signal to the first device.

Optionally, the electricity storage capability is a capability that the first device stores electric energy of the energy supply signal.

In some embodiments, the electricity storage capability includes at least one of the following:
whether electricity storage is supported; whether a battery is carried; an electricity storage duration; an electricity storage level; or a parameter of the electricity storage unit.

In an example, the electricity storage capability reported by the first device includes: whether electricity storage is supported, and an electricity storage duration.

In an example, the electricity storage capability reported by the first device includes: whether electricity storage is supported.

In an example, the electricity storage capability reported by the first device includes: an electricity storage duration.

In an example, the electricity storage capability reported by the first device includes: whether electricity storage is supported, an electricity storage level, and a parameter of the electricity storage unit.

In an example, the electricity storage capability reported by the first device includes: whether a battery is carried.

Optionally, the electricity storage capability indicates a capability that the first device stores electric energy provided by the energy supply signal.

Optionally, the first capability indicated by the first information transmitted by the first device to the second device includes the electricity storage capability, and the second device determines an energy supply signal transmitting parameter according to the received electricity storage capability.

Optionally, the second device determines one or more of a transmitting time, a transmitting duration, and the like of the energy supply signal according to the received electricity storage capability.

Optionally, the transmitting duration in a case that electricity storage is not supported is less than the transmitting duration in a case that the electricity storage is supported.

When the first device does not support electricity storage, the second device needs to provide the energy supply signal to the first device continuously. "Continuously" here may be understood as continuously transmitting the energy supply signal, but a brief interruption, for example, a microsecond level interruption, may be allowed. Optionally, when the first device does not support electricity storage, then the second device needs to provide the energy supply signal. The first device is driven to work based on the energy provided by the energy supply signal. When transmission of the energy supply signal stops, the first device cannot harvest energy, resulting in energy depletion of the first device, and the first device is powered off.

When the first device supports electricity storage and the first device receives the energy supply signal, the first device is driven to work based on the energy supply signal, and the electric energy of the energy supply signal to be collected is stored to an electricity storage unit of the first device. Then, in a case that the second device does not provide the energy supply signal, the first device may drive the first device to work based on the electric energy stored in the electricity storage unit until the electric energy stored in the electricity storage unit is depleted.

Optionally, the longer the electricity storage duration, the shorter the transmitting duration that the second device needs to transmit the energy supply signal; and the shorter the electricity storage duration, the longer the transmitting duration that the second device needs to transmit the energy supply signal.

Optionally, whether a battery is carried indicates whether the first device includes a battery. The battery may serve as a power supply to provide electric energy for the first device. When the first device carries the battery, the first device may be driven to work through the electric energy in the battery, and the second device does not need to transmit the energy supply signal continuously. When the first device does not carry the battery, the second device needs to transmit the energy supply signal continuously, so as to harvest the electric energy for driving the first device to work through the energy supply signal.

The electricity storage duration represents a duration that the electric energy stored by the first device from the energy supply signal drives the first device to work, which may be understood a duration that the first device works without relying on the energy supply signal.

In an example, the electricity storage duration may be 100 ms, 200 ms, 400 ms, or the like.

The electricity storage level represents an electricity storage duration or an electricity storage quantity.

Optionally, the longer the electricity storage duration or the greater the amount of stored electricity represented by the electricity storage level, the shorter the transmitting duration that the second device needs to transmit the energy supply signal; and the shorter the electricity storage duration or the lower the amount of stored electricity represented by the electricity storage level, the longer the transmitting duration that the second device needs to transmit the energy supply signal.

Optionally, there is a correspondence between the electricity storage level and the electricity storage duration, and the correspondence may be pre-agreed by the first device and the second device.

In an example, the electricity storage level includes the following three levels: level 1, level 2, and level 3. The correspondences of all electricity storage levels include: the electricity storage duration corresponding to level 1 is 100 ms, the electricity storage duration corresponding to level 2 is 200 ms, and the electricity storage duration corresponding to level 3 is 100 ms. When the electricity storage duration of the first device is 200 ms, it is determined that the electricity storage level is level 2. When the electricity storage level transmitted by the first device to the second device is level 2, the second device determines that the electricity storage duration is 200 ms based on the electricity storage level.

The parameter of the electricity storage unit can characterize the electric energy that the electricity storage unit can store.

Optionally, the electricity storage unit is a capacitor.

Taking the electricity storage unit being a capacitor as an example, the parameter of the electricity storage unit includes: a capacity of the capacitor.

For capability B, the channel support capability represents a location and/or a quantity of channels supported by the first device.

The channel support capability affects a channel used for communication between the first device and the second device.

Optionally, the location of the channel may include one or more of the following channel information: a channel number, a channel center frequency, a frequency band supported by the channel, and the like.

Optionally, the channel support capability includes at least one of the following:

a quantity and/or locations of supported Downlink (DL) channels; or a quantity and/or locations of supported Uplink (UL) channels.

Optionally, the first device transmits the channel support capability to the second device; and the second device receives the channel support capability and configures a channel for the first device according to the channel support capability of the first device.

Optionally, the quantity of the DL channels supported by the first device may be one or more.

In a case that there is one DL channel supported by the first device, the first device only supports a capability to receive a signal in one DL channel.

In a case that there are more DL channels supported by the first device, the first device has a capability to receive signals in a plurality of DL channels.

Optionally, the quantity of the UL channels supported by the first device may be one or more.

In a case that there is one UL channel supported by the first device, the first device only supports a capability to transmit a signal in one UL channel.

In a case that there are more UL channels supported by the first device, the first device has a capability to transmit signals in a plurality of UL channels.

Optionally, in a case that there are more UL channels supported by the first device, the first device may support a modulation method FSK. The modulation method used by the first device is the FSK, and the frequency of the signal transmitted by the first device is controlled by the first device.

In an example, the second device transmits a DL signal to the first device at a first frequency. The first device receives the DL signal with the first frequency, performs frequency mixing on the DL signal with the first frequency based on a local second frequency to obtain a frequency (that is, a third frequency) of a to-be-transmitted UL signal (that is, a backscatter signal), and transmits the UL signal with the third frequency to the second device.

13 communication channels divided from a communication frequency band supported by the first device and the second device include: channel 1, channel 2 to channel 13. The UL channel supported by the first device is channel 2, and the DL channels supported by the first device include: channel 3 and channel 4. Or, 13 communication channels divided from a communication frequency band supported by the first device and the second device include: channel 1, channel 2 to channel 13. The first device supports two UL channels: channel 2 and channel 6. The first device supports a DL channel: channel 5.

For capability C, the antenna gain represents a signal receiving capability of an antenna of the first device.

The antenna gain affects at least one of the following: a coverage, a signal transmission distance or a signal transmission rate of the first device.

Optionally, the antenna gain is in direct proportion to a size of the antenna of the first device.

The first device transmits the antenna gain to the second device. The second device determines at least one of the following according to the received antenna gain: a location range or the signal transmission rate of the first device.

For capability D: a modulation method support capability indicates a modulation method supported by the first device.

The channel support capability affects the modulation method used by a signal between the first device and the second device.

Optionally, the first device transmits the modulation method support capability to the second device. The second device determines the modulation method used by the signal interacted with the first device according to the modulation method support capability of the first device.

Optionally, in a case that the first device supports a plurality of modulation methods, the second device may determine a modulation method from the plurality of supported modulation methods, and indicates the determined modulation method to the first device. In this case, the first device communicates with the second device in a determined modulation method.

Optionally, the modulation method support capability includes at least one of the following:

a supported modulation method for DL; or a supported modulation method for UL.

The supported modulation method for DL may include one or more modulation methods.

The supported modulation method for UL may include one or more modulation methods.

Optionally, the supported modulation method for DL and the supported modulation method for UL are the same or different.

In some embodiments, the modulation method includes at least one of the following: ASK, FSK, or PSK.

In an example, the supported modulation method for DL of the first device is the ASK.

In an example, the supported modulation method for UL of the first device includes: the ASK, the FSK, and the PSK.

In an example, the supported modulation method for DL of the first device is the ASK, and the supported modulation method for UL is the FSK.

In an example, the supported modulation method for DL of the first device is the ASK, and the supported modulation method for UL includes the ASK, the FSK, and the PSK.

For capability E, the channel measurement capability indicates a capability of the first device to measure a supported channel.

The channel measurement capability affects whether the first device performs channel measurement.

Optionally, the first device transmits the channel measurement capability to the second device; and the second device may determine whether the first device supports the channel measurement according to the channel measurement capability, and instructs the first device to perform the channel measurement in a case of determining that the first device supports the channel measurement.

Optionally, a channel measurement result obtained by the first device by performing the channel measurement is reported to the second device; and the second device controls the first device according to the channel measurement result.

In some embodiments, the channel measurement capability includes at least one of the following:
whether channel measurement is supported, a supported channel measurement type, a measurement indicator, or measurement accuracy.

In some embodiments, the supported channel measurement type includes at least one of the following: channel state information measurement, Radio Resource Management (RRM) measurement, or Radio Link Monitoring (RLM) measurement.

In some embodiments, the measurement indicator includes at least one of the following: a Channel Quality Indicator (CQI), a Reference Signal Receiving Power (RSRP), Reference Signal Receiving Quality (RSRQ), or Signal to Interference plus Noise Ratio (SINR).

The CQI is a measurement indicator of the channel state information measurement, and the RSRP and the RSRQ are measurement indicators of the RRM measurement, and the RS-SINR is a measurement indicator of the RLM measurement.

Optionally, the measurement accuracy of the channel measurement capability may include the measurement accuracy of one or more measurement types.

For capability F, the power control capability indicates a capability of the first device to control the power of the transmitted signal.

The power control capability affects at least one of the following: a signal transmission distance or a signal transmission rate of the first device.

Optionally, the first device supports the power control capability based on the power consumed by a load.

Optionally, the first device adjusts the power consumed by the load based on adjustment of a resistor of the load.

Optionally, when the first device has the power control capability, the first device is provided with a plurality of loads, and realizes power control based on switching between different loads.

The first device transmits the power control capability to the second device, so that the second device knows the power control capability of the first device, and determines the location of the first device and the power of the transmitted signal according to the power control capability of the first device.

In some embodiments, the power control capability includes at least one of the following:
whether having or not the power control capability; or
a power control adjustment range.

In an example, when the first device has the power control capability, it is determined that the location of the first device may be adjusted in a first range.

In an example, when the first device does not have the power control capability, it is determined that the location of the first device may be range in a second range, and the range indicated by the second range is smaller than the range indicated by the first range.

In an example, when the first device has the power control capability, and the power control capability is in a first power control range, the second device determines that the location of the first device may be adjusted in a third range according to the power control capability. The third range is determined based on the first power control range.

Optionally, when the power control capability does not include whether having or not the power control capability, whether the first device has the power control capability may be determined based on the power control adjustment range. In an example, when the power control adjustment range is 0, it represents that the first device does not have the power control capability. In an example, when the power control adjustment range is not 0, it represents that the first device has the power control capability.

For capability G, the security capability indicates a capability that is provided by the first device and involves data security, including a supported encryption algorithms or encryption capabilities or security mechanisms.

The security capability affects encryption processing of the data interacted between the first device and the second device.

The first device transmits the security capability to the second device. The second device whether to perform the encryption processing on the data according to the received security capability, and an encryption processing manner used when performing the encryption processing.

Optionally, the second device determines whether to perform encryption on the data and the encryption processing manner used when performing the encryption processing according to the security capability of the first device and a working scenario.

Optionally, reliability requirements and/or memory overhead requirements in different working scenarios are different.

In an example, for some scenarios with relatively low privacy requirements (for example, temperature monitoring in public places), a simple encryption algorithm or a relatively simplified security mechanism may be used. However, for some scenarios with relatively low privacy requirements (for example, item management in a home environment, or monitoring of health indicators of a wearable device), a simple encryption algorithm or a relatively simplified security mechanism needs to be used.

In some embodiments, the security capability includes at least one of the following:
an encryption algorithm, an encryption capability, or a security mechanism.

In the embodiment of the disclosure, any limitation is not made to the encryption algorithms or encryption capabilities or security mechanisms supported by the first device.

For capability H, a supported coding type is a coding type that can be supported by the first device.

The supported coding type affects a coding type used by a signal for the communication between the first device and the second device.

Optionally, the first device transmits the supported coding type to the second device. The second device decodes the received signal based on the coding type supported by the first device.

Optionally, the first device transmits the supported coding type to the second device. The second device determines the used coding type from the coding type supported by the first device, and indicates the used coding type to the first device. In this case, the first device and the second code and decode the signal based on the used coding type.

The coding type supported by the first device includes one or more.

In some embodiments, the coding type includes at least one of the following:

NRZ coding, Manchester coding, unipolar RZ coding, DBP coding, Miller coding, or differential coding.

In an example, the first device supports the Manchester coding, and the first device and the second device code and decode the signal based on the Manchester coding.

In an example, the first device supports the NRZ coding and the Manchester coding. The first device and the second device code and decode the signal based on the NRZ coding.

In an example, the first device supports the NRZ coding, the Manchester coding, the unipolar RZ coding, the DBP coding, the Miller coding, and the differential coding. The first device and the second device code and decode the signal based on the unipolar RZ coding.

For capability I, the information storage capability indicates whether the first device can store data.

The information storage capability affects at least one of the following: data transmission rate, transmission of an energy supply signal provided by the second device to the first device, a time that the first device restores a connection or a network, or reconfiguration of configuration information for communication of the first device.

Optionally, the data stored by the information storage capability is the configuration information configured by the second device for the first device, that is, connection embellishment information.

Optionally, the storage capability of the first device is the storage capability of an internal memory of the first device.

In some embodiments, the information storage capability includes at least one of the following:

a storage capacity or a storage manner, the storage manner indicating whether to clear or store data stored by the first device in a case of power failure.

Here, the storage capacity is the capacity of storage space of the first device, and the storage capacity affects the data transmission rate. When the storage space of the first device is large, it is beneficial to scheduling a large data block, thereby supporting high-speed data transmission. When the storage space of the first device is small, it is not beneficial to scheduling a large data block but only supports the transmission of a small data block, thereby not supporting high-speed data transmission.

The storage manner indicates whether the stored data is erased in a case of power failure of the first device. The storage manner affects at least one of the following: the transmission of the energy supply signal of the second device, or the reconfiguration of the configuration information.

When the storage manner indicates that the stored data is erased in the case of the power failure of the first device, in the case of the power failure of the first device, the first device needs to re-establish a connection with the second device, and the first device needs to re-transmit the configuration information and communicates with the second device based on the reconfigured information.

When the storage manner indicates that the stored data is not erased in the case of the power failure of the first device, and the storage manner instructs the first device not to erase the stored data in the case of the power failure. In the case of the power failure of the first device, the first device can rapidly communicate with the second device based on the stored data, and rapidly restore the communication with a network device based on the stored configuration information.

When the storage manner indicates that the stored data is erased in the case of the power failure of the first device, the power failure of the first device greatly affects the communication of the first device and the second device. In this case, the power failure of the first device is reduced as much as possible, and the energy supply signal of the second device is transmitted continuously.

When the storage manner indicates that the stored data is not erased in the case of the power failure of the first device, the power failure of the first device slightly affects the communication between the first device and the second device, and the energy supply signal of the second device may be intermittently transmitted.

In some embodiments, the first information is used for the second device to determine a communication parameter. The communication parameter is used for controlling the communication between the second device and the first device.

In this case, the method further includes: the second device determines the communication parameter based on the first information. The communication parameter is used for controlling the communication between the second device and the first device.

The second device determines the communication parameter based on the first information, and transmits the communication parameter to the first device.

The first device receives the communication parameter transmitted by the second device, and communicates with the second device based on the communication parameter.

In some embodiments, the communication parameter includes at least one of the following:

parameter A: an energy supply signal transmission parameter, the energy supply signal transmission parameter being used for controlling transmission of an energy supply signal;

parameter B: channel configuration information, the channel configuration information being used for indicating a channel configured to the first device;

parameter C: a data transmission rate;

parameter D: a modulation method;

parameter E: measurement indication information, the measurement indication information being used for controlling execution of the measurement capability of the first device;

parameter F: power control information, the power control information being used for controlling execution of the power control capability of the first device;

parameter G: encryption indication information, the encryption indication information being used for indicating an encryption manner;

parameter H: a coding type; or parameter I: connection establishment information, the connection establishment information being used for controlling a manner of establishing a connection between the second device and the first device.

Optionally, parameter A may be determined at least according to one or more of the electricity storage capability and the information storage capability of the first device.

Optionally, parameter B may be determined at least according to the channel support capability of the first device.

Optionally, parameter C may be determined at least according to one or more of the antenna gain, the power control capability, and the information storage capability of the first device.

Optionally, parameter D may be determined at least according to the modulation method of the first device.

Optionally, parameter E may be determined at least according to the channel measurement capability of the first device.

Optionally, parameter F may be determined at least according to one or more of the antenna gain and the power control capability of the first device.

Optionally, parameter G may be determined at least according to the security capability of the first device.

Optionally, parameter H may be determined at least according to the coding type supported by the first device.

Optionally, parameter I may be determined at least according to one or more of the electricity storage capability and the information storage capability of the first device.

In some embodiments, the first device is a first terminal, and a terminal type of the first terminal is a zero-power-consumption terminal.

Optionally, the type of the zero-power-consumption terminal may include one of a passive zero-power-consumption terminal, a semi-passive zero-power-consumption terminal, and an active zero-power-consumption terminal.

The zero-power-consumption terminal in the embodiment of the disclosure may include an electronic label.

In some embodiments, the second device is a network device or a second terminal. A terminal type of the second terminal is a non-zero-power-consumption terminal.

In the embodiment of the disclosure, the first device may be communicated with the second device directly or through a third device serving as a relay device.

In an example, the first device is an Internet of things sensor, and the second device is a second terminal.

In an example, the first device is an Internet of things sensor, and the second device is a base station. In this case, the first device transmits first information to the relay device, and the relay device transmits the first information to the base station.

The wireless communication method provided by the embodiments of the disclosure is described below.

There are significant differences in some aspects between the zero-power-consumption terminal and a conventional communication terminal, and zero-power-consumption terminals may also be different in different application scenarios. There are differences between the zero-power-consumption terminal and the conventional communication terminal in the following aspects.

An electricity storage capability of the zero-power-consumption terminal (or called an energy harvesting capability)

During communication with a network device, the zero-power-consumption terminal requires the network device to continuously provide an energy supply signal. The terminal harvests radio energy carried by the energy supply signal to drive a circuit of the zero-power-consumption terminal to work. However, once transmission of the energy supply signal stops, the terminal does not harvest the energy, and the energy of the terminal will be depleted soon, resulting in that the device cannot work due to power off. Therefore, this type of terminal requires a network device to continuously provide the energy supply signal during working.

However, some zero-power-consumption terminals may have certain electricity storage capability. The radio energy that can be harvested by the terminal is stored in an energy storage unit. Therefore, even if the network device temporarily does not provide a wireless energy supply signal, the terminal may still use the electric energy stored in the energy storage unit to keep the terminal in an "activated" or working state. For example, the terminal may still perform operations such as receiving a signal transmitted by the network node, demodulating relevant information.

The electricity storage capability reported by the zero-power-consumption terminal includes at least one of the following:

whether having or not the electricity storage capability;

an electricity storage duration or an electricity storage level, herein, different electricity storage levels corresponds to a duration that the terminal can work only relying on the stored electric energy. For example, a working duration corresponding to 100 ms is level 1, a working duration corresponding to 200 ms is level 2, and a working duration corresponding to 400 ms is level 3; or a parameter of the electricity storage unit, herein it is a capacitance parameter, for example, a capacitance if the electricity storage unit uses a capacitor.

A DL and/or UL channel supportable by the zero-power-consumption terminal

A quantity and/or locations of supported DL channels

In a communication frequency band that can be supported by the zero-power-consumption terminal, a plurality of communication channels may be divided. However, the terminal may not necessarily support a plurality of communication channels, because it needs to have a capability of receiving a signal on each channel of the plurality of channels on terminal RF (for example, a filter, and an adjustment of a center frequency point of the filter) to support a plurality of communication channels. Therefore, some zero-power-consumption terminals may only support a capability to work on one DL channel, while some terminals have the capability to work on a plurality of DL channels.

A quantity and/or locations of supported UL channels

The quantity of the supported UL channels may also affect the design of hardware of the terminal. For example, when FSK modulation is used, a frequency location transmitted by the UL signal is controlled by a frequency generated locally by a terminal. Frequency mixing is performed on the DL signal transmitted by the network node and the frequency, so as to determine a frequency location of a backscatter signal. Therefore, a location supporting a plurality of UL channels means that the terminal at least needs to have a capability to generate a local frequency corresponding to the plurality of UL channels.

The terminal reports the quantity and/or location information of supported DL and/or UL channels to the network device. The network device may configure a suitable DL or UL channel required for the terminal during communication based on related capabilities of the terminal.

Antenna Gain of Zero-Power-Consumption Terminal

Volumes (or sizes), cost, and application scenarios that can be supported by the zero-power-consumption terminals in different application scenarios may be different. Therefore, some terminals have low cost and small sizes. Therefore, the antenna gain of the terminal is low (for example, a dipole antenna is used, and the corresponding antenna gain is 2 dBi). However, some zero-power-consumption terminals, for example, working in industrial Internet scenarios (such as monitoring in a power station, temperature, humidity, and voltage monitoring), may support high cost, and large volumes. This type of zero-power-consumption terminals pursue high performance even more, thereby supporting an antenna with a larger size, and supporting a higher antenna gain (for example, an array antenna, which may reach over ten dB or even tens of dB).

Different antenna gains affect network coverage, that is, a transmission distance of a DL or UL (reflected signal) of the zero-power-consumption terminal. A data transmission rate of data is also affected. Therefore, the zero-power-consumption terminal reports the antenna gain to a network, which helps the network determine setting of a transmission related parameter.

Modulation Method Supported by the Zero-Power-Consumption Terminal

Waveforms, that is, a modulation method of the signal, supported by different zero-power-consumption terminals may be different. Generally speaking, the zero-power-consumption terminal supports receiving the ASK modulation signal, that is, the DL supports the ASK. For UL, different zero-power-consumption terminals may support different modulation methods, for example, the ASK, the FSK, and the PSK. Of course, the zero-power-consumption terminal may report the supported modulation method of the DL or UL to the network. Of course, one case is that all zero-power-consumption terminals support a default modulation method, for example, the ASK for the DL, and the FSK for the UL. However, some zero-power-consumption terminals further support other modulation methods, for example, the UL further supports the PSK or the ASK.

Channel Measurement Capability Supported by Zero-Power-Consumption Terminal

The zero-power-consumption terminal is simple in structure. The baseband only has one low-power processor, and only supports a relatively simple computing operation. Therefore, not all zero-power-consumption terminals support channel measurement, such as CSI, or support mobility measurement, such as RSRP, RSRQ, and RS-SINR measurement in RRM measurement. Therefore, the terminal supporting corresponding measurement may report the measurement capability to the network, for example, supporting which types of measurement (CSI, RRM, and RLM), supported measurement indicators (CQI, RSRP, RSRQ, and RS-SINR), or supported measurement accuracy.

Power Control Capability Supported by Zero-Power-Consumption Terminal

Since the zero-power-consumption terminal uses a backscatter manner, generally speaking, the power of the UL signal of the backscatter is equal to the power of the DL signal received by the zero-power-consumption terminal (the DL signal transmitted by the network device for backscattering) minus the power consumed by a terminal load. Therefore, the terminal may only adjust the backscatter signal power by adjusting the power consumed by the load. Therefore, a general zero-power-consumption terminal does not support the power control of the backscatter signal. Some zero-power-consumption terminals allow to support a more complex hardware structure, and may have a certain load resistance adjustment capability. Therefore, a certain degree of power control can be realized. Therefore, the zero-power-consumption terminal may report whether to support the power control to the network device, or a dynamic range of supported power control (for example, power adjustment performed within a range of 10 dB, that is, having the power adjustment capability within the range of 10 dB).

Encryption Capability and Security Mechanism Supported by Zero-Power-Consumption Terminal The processing capabilities of low-power-consumption processors supported by different zero-power-consumption terminals are different, and the supported internal memory capacities may also be different. All these factors will affect the selection of the encryption algorithm. Therefore, different algorithms affect calculation complexity, and require different internal memory overhead. In addition, different corresponding working scenarios require different reliability requirements for encryption. For some scenarios with relatively low privacy requirements (for example, temperature monitoring of public places), a simple encryption algorithm or a relatively simplified security mechanism may be used. However, for some scenarios with relatively low privacy requirements (for example, item management in a home environment, or monitoring of health indicators of a wearable device), a simple encryption algorithm or a relatively simplified security mechanism needs to be used. Therefore, during communication, the zero-power-consumption terminal may report a supported encryption algorithm, or an encryption capability, or a supported security mechanism to the network, so that the network device determines a suitable manner to encrypt the communication of the terminal.

Coding Type Supported by Zero-Power-Consumption Terminal

Zero-power-consumption communication may support a variety of coding manners, such as NRZ coding, Manchester coding, unipolar RZ coding, DBP coding, Miller coding, and differential coding. Corresponding to different applications, different scenarios, and different channel conditions, different coding manners may be required. Therefore, the zero-power-consumption terminal may report the type of the coding manner supported by the network device to the network device, so that the network device may select a suitable coding manner in a subsequent communication process.

Information Storage Capability Supported by Zero-Power-Consumption Terminal

Different zero-power-consumption terminals are subject to requirements such as volume, size, and cost. The capabilities of the supported storage units are different, for example, the supported internal memory capacities. A large internal memory is beneficial to scheduling a large data block, so as to support a high rate. A small internal memory only supports transmission of a small data block. In addition, based on the implementation of different storage units, some types of storage units may store information in a case of power failure, and the information will be erased in a case that some types of storage units are in power failure. Corresponding to zero-power-consumption communication, for the terminal supporting a storage unit that may store information in a case of power failure, the network may stop transmitting the energy supply signal during the intermission of communication. Even if temporary power off is caused because the terminal cannot receive wireless energy supply signal, once the network device retransmits the energy supply signal, so that the zero-power-consumption terminal is activated. The activated zero-power-consumption terminal may still rapidly restore the communication of the network, because the terminal still stores the configuration information transmitted by the network in a previous communication process. For the terminal supporting the storage unit that may store the information in a case of power failure, the terminal needs to establish a connection after being restarted in a case of power failure. Therefore, the terminal reports the corresponding previous capability to store the information to the network device, which is beneficial for the network device to select different data transmission and connection establishment manners for different terminals.

It is to be noted that the zero-power-consumption terminal reports the above related capabilities, it indicates that the zero-power-consumption terminal has a data connection with a network device. The establishment of the data connection also requires a basic capability of the zero-power-consumption terminal, for example, a basic coding manner and a coding manner. The basic capability may be agreed with the zero-power-consumption terminal by the network device through a prior agreement. After the zero-power-consumption terminal reports the above capability, a communication manner may be adjusted to a communication manner set according to the reporting capability.

The embodiment of the disclosure provides a capability reporting manner. The zero-power-consumption terminal reports related capability to the network device in a zero-power-consumption communication process, so that the network device selects a suitable communication or sets a suitable communication parameter based on the reporting capability.

The preferred implementations of the disclosure are described in detail above with reference to the drawings. However, the disclosure is not limited to specific details in the above implementations. Within the scope of the technical concept of the disclosure, a variety of simple variants of the technical solution of the disclosure can be carried out, and these simple variants belong to the scope of protection of the disclosure. For example, each specific technical feature described in the above specific implementations can be combined in any suitable way without contradiction. In order to avoid unnecessary repetition, the disclosure will not describe various possible combination modes separately. For another example, various different implementation modes of the disclosure can also be combined arbitrarily, which is also considered as the content disclosed in the disclosure as long as not violating the idea of the disclosure. For another example, without conflict, the technical features described in the various embodiments and/or embodiments described in the disclosure can be arbitrarily combined with existing technology, and the technical solutions obtained after combining will fall within the scope of protection of the disclosure.

It is also to be understood that, in various method embodiments of the disclosure, the sequence numbers of various processes above do not mean execution sequences. The execution sequences of various processes should be determined according to functions and internal logic of the processes, and should not be construed as any limitation on the implementation processes of the embodiments of the disclosure. In addition, in the embodiment of the disclosure, terms "downlink", "uplink", and "sidelink" are used to indicate a transmission direction of a signal or data. The "downlink" is used for indicating that the transmission direction of the signal or data is a first direction transmitted from a site to a UE in a cell. The "uplink" is used for indicating that the transmission direction of the signal or data is a second direction transmitted from the UE in the cell to the site. The "sidelink" is used for indicating that the transmission direction of the signal or data is a third direction transmitted from a UE 1 to a UE 2. For example, an "downlink signal" indicates that the transmission of the signal is the first direction. In addition, in the embodiments of the disclosure, terms "and/or" only describes an association relationship for describing associated objects and represents that three relationships may exist. Specifically, A and/or B may represent three cases: only A exists, both A and B exist, and only B exists. In addition, the character "I" herein generally indicates that the contextual objects are in an "or" relationship.

Figure 15:
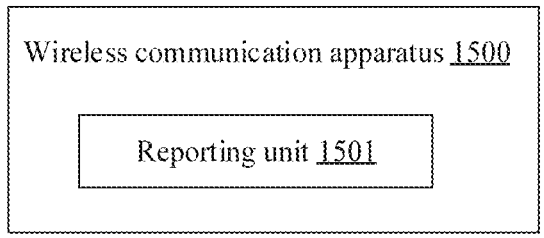
FIG. 15 is an optional schematic structural diagram of a wireless communication apparatus according to an embodiment of the disclosure.

FIG. 15 is a schematic diagram 1 of structural compositions of a wireless communication apparatus provided by an embodiment of the disclosure, which is applied to a first device. As shown in FIG. 15, the wireless communication apparatus includes a reporting unit 1501.

The reporting unit 1501 is configured to report first information to a second device. The first information is applied to backscatter communication.

In some embodiments, the reporting unit 1501 is further configured to report the first information to the second device through a first connection with the second device.

In some embodiments, the first connection is established based on second information.

In some embodiments, the second information is pre-agreed by the first device and the second device.

In some embodiments, the second information includes at least one of the following:

a coding type or a modulation method.

In some embodiments, the first information is used for indicating a first capability of the first device, and the first capability includes at least one of the following:

an electricity storage capability, a channel support capability, an antenna gain, a modulation method support capability, a channel measurement capability, a power control capability, a security capability, a supported coding type, or an information storage capability.

In some embodiments, the electricity storage capability includes at least one of the following:

whether electricity storage is supported; an electricity storage duration; an electricity storage level; and a parameter of the electricity storage unit.

In some embodiments, the channel support capability includes at least one of the following:

a quantity and/or locations of supported DL channels; or
a quantity and/or locations of supported UL channels.

In some embodiments, the modulation method support capability includes at least one of the following:

a supported modulation method for DL; or
a supported modulation method for UL.

In some embodiments, the supported modulation method for DL and the supported modulation method for UL are the same or different.

In some embodiments, the modulation method includes at least one of the following:

Amplitude Shift Keying (ASK), Frequency Shift Keying (FSK), or Phase Shift Keying (PSK).

In some embodiments, the channel measurement capability includes at least one of the following:

a supported channel measurement type, a supported channel measurement type, a measurement indicator, or measurement accuracy.

In some embodiments, the supported channel measurement type includes at least one of the following: channel state information measurement, RRM measurement, or RLM measurement.

In some embodiments, the measurement indicator includes at least one of the following: a CQI, RSRP, RSRQ, or a Reference Signal-Signal to Interference plus Noise Ratio (RS-SINR).

In some embodiments, the power control capability includes at least one of the following:
whether having or not the power control capability; or
a power control adjustment range.

In some embodiments, the security capability includes at least one of the following:
an encryption algorithm, an encryption capability, or a security mechanism.

In some embodiments, the coding type includes at least one of the following:
NRZ coding, Manchester coding, unipolar RZ coding, DBP coding, Miller coding, or differential coding.

In some embodiments, the information storage capability includes at least one of the following:
a storage capacity or a storage manner, the storage manner indicating whether to clear or store data stored by the first device in a case of power failure.

In some embodiments, the first information is used for the second device to determine a communication parameter. The communication parameter is used for controlling the communication between the second device and the first device.

In some embodiments, the communication parameter includes at least one of the following:
an energy supply signal transmission parameter, the energy supply signal transmission parameter being used for controlling transmission of an energy supply signal;
channel configuration information, the channel configuration information being used for indicating a channel configured to the first device;
a data transmission rate;
a modulation method;
measurement indication information, the measurement indication information being used for controlling execution of the measurement capability of the first device;
power control information, the power control information being used for controlling execution of the power control capability of the first device;
encryption indication information, the encryption indication information being used for indicating an encryption manner;
a coding type; or
connection establishment information, the connection establishment information being used for controlling a manner of establishing a connection between the second device and the first device.

In some embodiments, the first device is a first terminal, and a terminal type of the first terminal is a zero-power-consumption terminal.

In some embodiments, the second device is a network device or a second terminal. A terminal type of the second terminal is a non-zero-power-consumption terminal.

Figure 16:
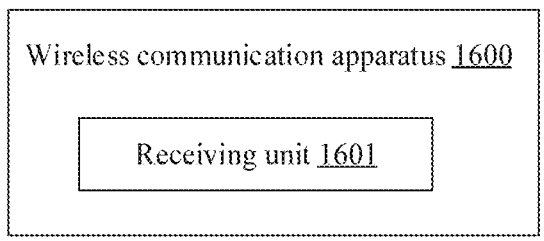
FIG. 16 is an optional schematic structural diagram of a wireless communication apparatus according to an embodiment of the disclosure.

A wireless communication apparatus provided by the embodiments of the disclosure, applied to a second device, as shown in FIG. 16, includes a receiving unit 1601.

The receiving unit 1601 is configured to receive first information reported by a first device. The first information is applied to backscatter communication.

In some embodiments, the receiving unit 1601 is further configured to receive, through a first connection with the first device, the first information reported by the first device.

In some embodiments, the first connection is established based on second information.

In some embodiments, the second information is pre-agreed by the first device and the second device.

In some embodiments, the second information includes at least one of the following:
a coding type or a modulation method.

In some embodiments, the first information is used for indicating a first capability of the first device, and the first capability includes at least one of the following:
an electricity storage capability, a channel support capability, an antenna gain, a modulation method support capability, a channel measurement capability, a power control capability, a security capability, a supported coding type, or an information storage capability.

In some embodiments, the electricity storage capability includes at least one of the following:
whether electricity storage is supported; an electricity storage duration; an electricity storage level; or a parameter of the electricity storage unit.

In some embodiments, the channel support capability includes at least one of the following:
a quantity and/or locations of supported DL channels; or
a quantity and/or locations of supported UL channels.

In some embodiments, the modulation method support capability includes at least one of the following:
a supported modulation method for DL; or
a supported modulation method for UL.

In some embodiments, the supported modulation method for DL and the supported modulation method for UL are the same or different.

In some embodiments, the modulation method includes at least one of the following:
ASK, FSK, or PSK.

In some embodiments, the channel measurement capability includes at least one of the following:
a supported channel measurement type, a supported channel measurement type, a measurement indicator, or measurement accuracy.

In some embodiments, the supported channel measurement type includes at least one of the following: channel state information measurement, RRM measurement, or RLM measurement.

In some embodiments, the measurement indicator includes at least one of the following: a CQI, RSRP, RSRQ, or an RS-SINR.

In some embodiments, the power control capability includes at least one of the following:
whether having or not the power control capability; or
a power control adjustment range.

In some embodiments, the security capability includes at least one of the following:
an encryption algorithm, an encryption capability, or a security mechanism.

In some embodiments, the coding type includes at least one of the following:
Non Return-to-Zero (NRZ) coding, Manchester coding, unipolar RZ coding, Differential Binary Phase (DBP) coding, Miller coding, or differential coding.

In some embodiments, the information storage capability includes at least one of the following:
a storage capacity or a storage manner, the storage manner indicating whether to clear or store data stored by the first device in a case of power failure.

In some embodiments, the apparatus 1600 may further include a determination unit.

The determination unit is configured to determine a communication parameter based on the first information. The communication parameter is used for controlling communication between the second device and the first device.

In some embodiments, the communication parameter includes at least one of the following:
- an energy supply signal transmission parameter, the energy supply signal transmission parameter being used for controlling transmission of an energy supply signal;
- channel configuration information, the channel configuration information being used for indicating a channel configured to the first device;
- a data transmission rate;
- a modulation method;
- measurement indication information, the measurement indication information being used for controlling execution of the measurement capability of the first device;
- power control information, the power control information being used for controlling execution of the power control capability of the first device;
- encryption indication information, the encryption indication information being used for indicating an encryption manner;
- a coding type; or
- connection establishment information, the connection establishment information being used for controlling a manner of establishing a connection between the second device and the first device.

In some embodiments, the first device is a first terminal, and a terminal type of the first terminal is a zero-power-consumption terminal.

In some embodiments, the second device is a network device or a second terminal. A terminal type of the second terminal is a non-zero-power-consumption terminal.

Those skilled in the art will understand that the relevant description of the above wireless communication apparatus of the embodiments of the disclosure can be understood with reference to the relevant description of the wireless communication method of the embodiments of the disclosure.

Figure 17:
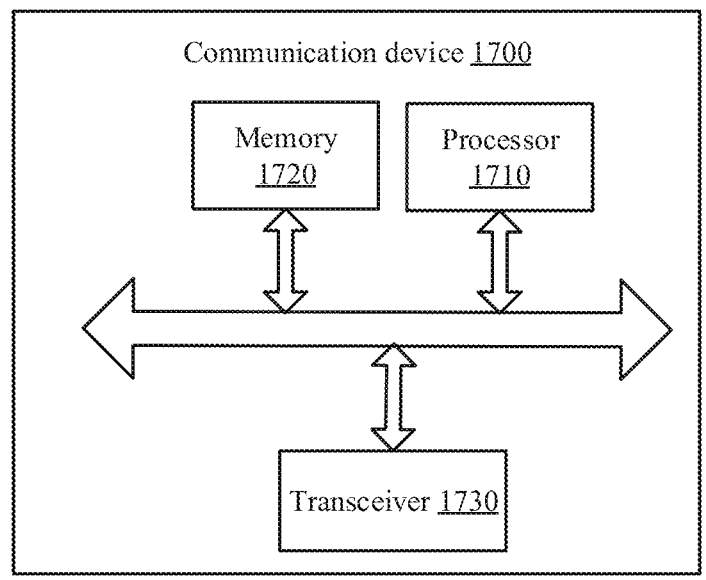
FIG. 17 is a schematic structural diagram of a communication device provided by an embodiment of the disclosure.

FIG. 17 is a schematic structural diagram of a communication device 1700 provided by an embodiment of the disclosure. The communication device may be a first device or a second device. The communication device 1700 as shown in FIG. 17 includes a processor 1710. The processor 1710 may invoke and run a computer program from a memory to implement the method in the embodiment of the disclosure.

Optionally, as shown in FIG. 17, the communicationl device 1700 may further include a memory 1720. The processor 1710 may invoke and run the computer program from the memory 1720 to implement the method in the embodiments of the disclosure.

The memory 1720 may be independent of the processor 1710, or may be integrated into the processor 1710.

Optionally, as shown in FIG. 17, the communications device 1700 may also include a transceiver 1730. The processor 1710 may control the transceiver 1730 to be in communication with other devices, specifically, to transmit information or data to other devices, or receive the information or data sent by other devices.

The transceiver 1730 may include a transmitter and a receiver. The transceiver 1730 may further include an antenna. There may be one or more antennae.

Optionally, the communications device 1700 may specifically be a network device of the embodiment of the disclosure, and the communication device 1700 may implement corresponding flows implemented by the network device in various methods of the embodiments of the disclosure, which will not be elaborated here for simplicity.

Optionally, the communications device 1700 may specifically be a mobile terminal/a terminal device of the embodiment of the disclosure, and the communication device 1700 may implement corresponding flows implemented by the mobile terminal/the terminal device in various methods of the embodiments of the disclosure, which will not be elaborated here for simplicity.

Figure 18:
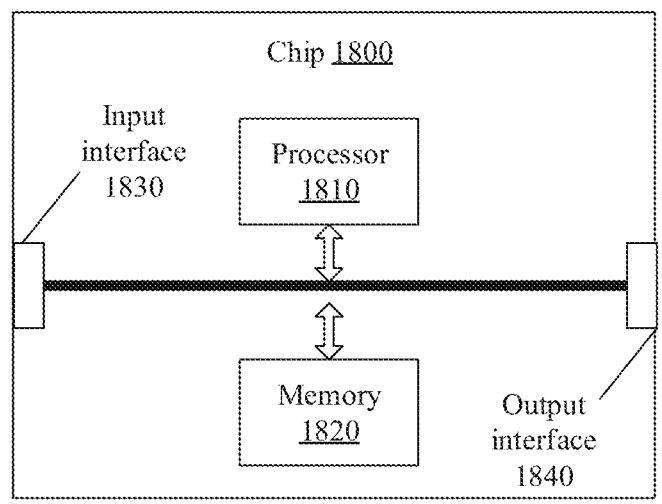
FIG. 18 is a schematic structural diagram of a chip of an embodiment of the disclosure.

FIG. 18 is a schematic structural diagram of a chip of an embodiment of the disclosure. The chip 1800 as shown in FIG. 18 includes a processor 1810. The processor 1810 may invoke and run a computer program from a memory to implement the method in the embodiments of the disclosure.

Optionally, as shown in FIG. 18, the chip 1800 may further include a memory 1820. The processor 1810 may invoke and run the computer program from the memory 1820 to implement the method in the embodiments of the disclosure.

The memory 1820 may be independent of the processor 1810, or may be integrated into the processor 1810.

Optionally, the chip 1800 may further include an input interface 1830. The processor 1810 may control the input interface 1830 to be in communication with other devices or chips, specifically, to acquire the information or data transmitted by other devices or chips.

Optionally, the chip 1800 may further include an output interface 1840. The processor 1810 may control the output interface 1840 to be in communication with other devices or chips, specifically, to output information or data sent to other devices or chips.

Optionally, the chip may be applied to a network device in the embodiments of the disclosure, and the chip may implement corresponding flows implemented by the network device in various methods of the embodiments of the disclosure, which will not be elaborated here for simplicity.

Optionally, the communications device may specifically be a mobile terminal/a terminal device of the embodiment of the disclosure, and the chip may implement corresponding flows implemented by the mobile terminal/the terminal device in various methods of the embodiments of the disclosure, which will not be elaborated here for simplicity.

It should be understood that the chip mentioned in the embodiment of the disclosure may also be called a system-level chip, a system chip, a chip system or a system on chip, etc.

Figure 19:
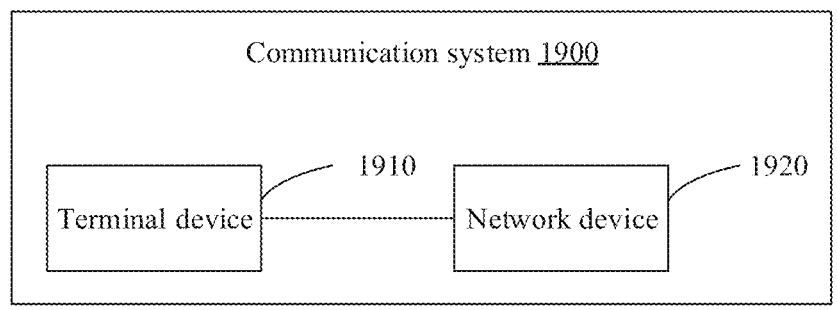
FIG. 19 is a schematic block diagram of a communication system provided by an embodiment of the disclosure.

FIG. 19 is a schematic block diagram of a communication system 1900 provided by an embodiment of the disclosure. As shown in FIG. 19, the communication system 1900 includes a terminal device 1910 and a network device 1920.

The terminal device 1910 may be configured to realize corresponding functions realized by the terminal device in the above method, and the network device 1920 may be configured to realize corresponding functions realized by the network device in the above method, which will not be elaborated here for simplicity.

It should be understood that the processor of the embodiments of the disclosure may be an integrated circuit chip with signal processing capacity. In an implementation process, various steps of the above method embodiments may be completed by an integrated logic circuit of hardware in the processor or an instruction in the form of software. The above processor may be a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components. Various methods, steps, and logical block diagrams disclosed in the embodiments of the disclosure may be implemented or performed. The general-purpose processor may be a microprocessor, any conventional processor, or the like. Steps of the methods disclosed with reference to the embodiments of the disclosure may be directly performed and accomplished by a hardware decoding processor, or may be performed and accomplished by a combination of hardware and software modules in the decoding processor. The software module may be located in a storage medium mature in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It may be understood that the memory in the embodiments of the disclosure may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a RAM, which is used as an external high-speed cache. By way of example but not restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described in this specification includes but is not limited to these and any other proper types of memories.

It should be understood that the abovementioned memories are exemplary but not restrictive, for example, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM). That is to say, the memories described in the embodiment of the disclosure are intended to include, but not limited to, these and any other suitable types of memories.

The embodiments of the disclosure further provide a computer-readable storage medium, which is configured to store a computer program.

Optionally, the computer-readable storage medium may be applied to a network device in the embodiments of the disclosure. The computer program enables a computer to execute corresponding flows implemented by the network device in each method of the embodiments of the disclosure, which will not be elaborated here for simplicity.

Optionally, the computer-readable storage medium may be applied to a mobile terminal/a terminal device in the embodiments of the disclosure. The computer program enables a computer to execute corresponding flows implemented by the mobile terminal/the terminal device in each method of the embodiments of the disclosure, which will not be elaborated here for simplicity.

The embodiments of the disclosure further provide a computer program product, which includes a computer program instruction.

Optionally, the computer program product may be applied to a network device in the embodiments of the disclosure. The computer program instruction enables a computer to execute corresponding flows implemented by the network device in each method of the embodiments of the disclosure, which will not be elaborated here for simplicity.

Optionally, the computer program product may be applied to a mobile terminal/a terminal device in the embodiments of the disclosure. The computer program instruction enables a computer to execute corresponding flows implemented by the mobile terminal/the terminal device in each method of the embodiments of the disclosure, which will not be elaborated here for simplicity.

The embodiments of the disclosure further provide a computer program.

Optionally, the computer program may be applied to a network device in the embodiments of the disclosure. The computer program runs in a computer to enable the computer to execute corresponding flows implemented by the network device in each method of the embodiments of the disclosure, which will not be elaborated here for simplicity.

Optionally, the computer program may be applied to a mobile terminal/a terminal device in the embodiments of the disclosure. When running on a computer, the computer program enables a computer to execute corresponding flows implemented by the mobile terminal/the terminal device in each method of the embodiments of the disclosure, which will not be elaborated here for simplicity.

Those of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may realize the described functions for each particular disclosure by different methods, but it is not be considered that the implementation is beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in the disclosure, it should be understood that the disclosed system, apparatus, and method may be implemented in other modes. For example, the apparatus embodiment described above is only schematic, and for example, division of the units is only logic function division, and other division manners may be adopted during practical implementation. For example, a plurality of units or components may be combined or integrated into another system, or some characteristics may be neglected or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in various embodiments of the disclosure may be integrated into one processing unit, or each of the units may be physically separated, or two or more units may be integrated into one unit.

When the functions are realized in a form of a software functional unit and sold or used as an independent product, they may be stored in a computer-readable storage medium. Based on this understanding, the technical solutions of the embodiments of the disclosure essentially or the parts that contribute to the prior art, or part of the technical solutions can be embodied in the form of a software product. The computer software product is stored in a storage medium, including a plurality of instructions for causing a computer device (which may be a personal computer, a server, or a network device, and the like) to execute all or part of the steps of the method described in the embodiments of the disclosure. The foregoing storage medium includes a USB flash disk, a mobile hard disk drive, a ROM, a RAM, and various media that can store program codes, such as a magnetic disk or an optical disk.

The above descriptions are merely specific implementation modes of the disclosure, but are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure shall be subject to the scope of protection of the claims.

The invention claimed is:

1. A wireless communication method, comprising:
reporting, by a first device, first information to a second device, the first information being applied to backscatter communication,
wherein the first information is used for indicating a first capability of the first device, and the first capability comprises at least one of the following:
an electricity storage capability, a channel support capability, an antenna gain, a modulation method support capability, a channel measurement capability, a power control capability, a security capability, a supported coding type, or an information storage capability,
wherein the electricity storage capability comprises at least one of the following: whether electricity storage is supported; an electricity storage duration; an electricity storage level; or a parameter of the electricity storage unit;
wherein the channel support capability comprises at least one of the following: a quantity and/or locations of supported Downlink (DL) channels; or a quantity and/or locations of supported Uplink (UL) channels; and
wherein the modulation method support capability comprises at least one of the following: a supported modulation method for DL; or a supported modulation method for UL.

2. The method of claim 1, wherein reporting, by the first device, first information to the second device comprises:
reporting, by the first device, the first information to the second device through a first connection with the second device.

3. The method of claim 2, wherein the first connection is established based on second information, and wherein the second information is pre-agreed by the first device and the second device.

4. The method of claim 3, wherein the second information comprises at least one of the following:
a coding type or a modulation method.

5. The method of claim 1, wherein the supported modulation method for DL and the supported modulation method for UL are the same or different, and wherein the modulation method comprises at least one of the following:
Amplitude Shift Keying (ASK), Frequency Shift Keying (FSK), or Phase Shift Keying (PSK).

6. A wireless communication method, comprising:
receiving, by a second device, first information reported by a first device, the first information being applied to backscatter communication,
wherein the first information is used for indicating a first capability of the first device, and the first capability comprises at least one of the following:
an electricity storage capability, a channel support capability, an antenna gain, a modulation method support capability, a channel measurement capability, a power control capability, a security capability, a supported coding type, or an information storage capability,
wherein the electricity storage capability comprises at least one of the following: whether electricity storage is supported; an electricity storage duration; an electricity storage level; or a parameter of the electricity storage unit;
wherein the channel support capability comprises at least one of the following: a quantity and/or locations of supported Downlink (DL) channels; or a quantity and/or locations of supported Uplink (UL) channels; and
wherein the modulation method support capability comprises at least one of the following: a supported modulation method for DL; or a supported modulation method for UL.

7. The method of claim 6, wherein the supported modulation method for DL and the supported modulation method for UL are the same or different, and wherein the modulation method comprises at least one of the following:
Amplitude Shift Keying (ASK), Frequency Shift Keying (FSK), or Phase Shift Keying (PSK).

8. The method of claim 6, wherein the channel measurement capability comprises at least one of the following:
whether channel measurement is supported, a supported channel measurement type, a measurement indicator, or measurement accuracy,
wherein the supported channel measurement type comprises at least one of the following: channel state information measurement, Radio Resource Management (RRM) measurement, or Radio Link Monitoring (RLM) measurement, and
wherein the measurement indicator comprises at least one of the following: a Channel Quality Indicator (CQI), Reference Signal Receiving Power (RSRP), Reference Signal Receiving Quality (RSRQ), or a Reference Signal-Signal to Interference plus Noise Ratio (RS-SINR).

9. The method of claim 6, wherein the receiving, by a second device, first information reported by a first device comprises:
receiving, by the second device through a first connection with the first device, the first information reported by the first device.

10. The method of claim 9, wherein the first connection is established based on second information, and wherein the second information is pre-agreed by the first device and the second device.

11. A wireless communication apparatus, applied to a first device, the apparatus comprising:
a processor, a memory and a transceiver, wherein the memory is configured to store computer-executable instructions; and the processor is configured to invoke and run the computer-executable instructions stored in the memory to perform an operation of:
reporting, through the transceiver, first information to a second device, the first information being applied to backscatter communication,
wherein the first information is used for indicating a first capability of the first device, and the first capability comprises at least one of the following:
an electricity storage capability, a channel support capability, an antenna gain, a modulation method support capability, a channel measurement capability, a power control capability, a security capability, a supported coding type, or an information storage capability,
wherein the electricity storage capability comprises at least one of the following: whether electricity storage is supported; an electricity storage duration; an electricity storage level; or a parameter of the electricity storage unit;
wherein the channel support capability comprises at least one of the following: a quantity and/or locations of supported Downlink (DL) channels; or a quantity and/or locations of supported Uplink (UL) channels; and
wherein the modulation method support capability comprises at least one of the following: a supported modulation method for DL; or a supported modulation method for UL.

12. The apparatus of claim 11, wherein the power control capability comprises at least one of the following: whether having or not the power control capability; or a power control adjustment range,
wherein the security capability comprises at least one of the following:
an encryption algorithm, an encryption capability, or a security mechanism.

13. The apparatus of claim 11, wherein the coding type comprises at least one of the following:
Non Return-to-Zero (NRZ) coding, Manchester coding, unipolar Return-to-Zero (RZ) coding, Differential Binary Phase (DBP) coding, Miller coding, or differential coding.

14. The apparatus of claim 11, wherein the information storage capability comprises at least one of the following:
a storage capacity or a storage manner, the storage manner indicating whether to clear or store data stored by the first device in a case of power failure.

15. A wireless communications apparatus, applied to a second device, the apparatus comprising:
a processor, a memory and a transceiver, wherein the memory is configured to store computer-executable instructions; and the processor is configured to invoke and run the computer-executable instructions stored in the memory to perform an operation of:
receiving, through the transceiver, first information reported by a first device, the first information being applied to backscatter communication,
wherein the first information is used for indicating a first capability of the first device, and the first capability comprises at least one of the following:
an electricity storage capability, a channel support capability, an antenna gain, a modulation method support capability, a channel measurement capability, a power control capability, a security capability, a supported coding type, or an information storage capability,
wherein the electricity storage capability comprises at least one of the following: whether electricity storage is supported; an electricity storage duration; an electricity storage level; or a parameter of the electricity storage unit;
wherein the channel support capability comprises at least one of the following: a quantity and/or locations of supported Downlink (DL) channels; or a quantity and/or locations of supported Uplink (UL) channels; and
wherein the modulation method support capability comprises at least one of the following: a supported modulation method for DL; or a supported modulation method for UL.

16. The apparatus of claim 15, wherein the processor is configured to invoke and run the computer-executable instructions stored in the memory to further perform an operation of:
determining a communication parameter based on the first information, the communication parameter being used for controlling communication between the second device and the first device.

17. The apparatus of claim 16, wherein the communication parameter comprises at least one of the following:
an energy supply signal transmission parameter, the energy supply signal transmission parameter being used for controlling transmission of an energy supply signal;
channel configuration information, the channel configuration information being used for indicating a channel configured to the first device;
a data transmission rate;
a modulation method;
measurement indication information, the measurement indication information being used for controlling execution of the measurement capability of the first device;
power control information, the power control information being used for controlling execution of the power control capability of the first device;
encryption indication information, the encryption indication information being used for indicating an encryption manner;
a coding type; or
connection establishment information, the connection establishment information being used for controlling a manner of establishing a connection between the second device and the first device.

18. The apparatus of claim 15, wherein the first device is a first terminal, and a terminal type of the first terminal is a zero-power-consumption terminal.

19. The apparatus of claim 15, wherein the second device is a network device or a second terminal, and a terminal type of the second terminal is a non-zero-power-consumption terminal.

20. The apparatus of claim 11, wherein the supported modulation method for DL and the supported modulation method for UL are the same or different, and wherein the modulation method comprises at least one of the following:
Amplitude Shift Keying (ASK), Frequency Shift Keying (FSK), or Phase Shift Keying (PSK).

* * * * *